(12) United States Patent
Cha et al.

(10) Patent No.: US 9,862,275 B2
(45) Date of Patent: Jan. 9, 2018

(54) FAIL SAFE APPARATUS AND METHOD FOR ECO-FRIENDLY VEHICLE

(71) Applicant: HYUNDAI MOTOR COMPANY, Seoul (KR)

(72) Inventors: Jung Min Cha, Incheon (KR); Dae Ro Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 402 days.

(21) Appl. No.: 14/816,364

(22) Filed: Aug. 3, 2015

(65) Prior Publication Data
US 2016/0303976 A1    Oct. 20, 2016

(30) Foreign Application Priority Data
Apr. 15, 2015    (KR) .................. 10-2015-0053209

(51) Int. Cl.
*B60W 20/00*    (2016.01)
*B60L 3/00*    (2006.01)
(Continued)

(52) U.S. Cl.
CPC ........... *B60L 3/0046* (2013.01); *B60L 3/0084* (2013.01); *B60L 11/14* (2013.01); *B60L 11/1809* (2013.01);
(Continued)

(58) Field of Classification Search
CPC ...... B60W 20/50; B60W 10/02; B60W 10/24; B60W 10/26; B60W 10/08; B60L 11/1861; B60L 11/1862; B60L 3/0084; B60L 3/0046; B60L 3/04; B60L 11/14; Y02T 90/16; Y10S 903/907
See application file for complete search history.

(56) References Cited

U.S. PATENT DOCUMENTS

| 9,669,723 B2* | 6/2017 | Sugeno ................. B60L 3/0046 |
| 2009/0243554 A1* | 10/2009 | Gu ........................... B60K 6/48 |
| | | 320/162 |

FOREIGN PATENT DOCUMENTS

| JP | 2011-41386 | 2/2011 |
| JP | 2013-212755 | 10/2013 |

(Continued)

OTHER PUBLICATIONS

Kamachi, M., H. Miyamoto, and Y. Sano. "Development of power management system for electric vehicle "i-MiEV"." Power Electronics Conference (IPEC), 2010 International. IEEE, 2010, pp. 2949-2955.*

*Primary Examiner* — Ryan Johnson
(74) *Attorney, Agent, or Firm* — Brinks Gilson & Lione

(57) ABSTRACT

The fail safe apparatus for an eco-friendly vehicle includes: a main battery to supply driving power of a vehicle; a battery controller to manage a state of charge of the main battery; a power converter to convert power supplied from the main battery into power for charging an auxiliary battery; a motor controller to drive a motor with the power supplied from the main battery; a hybrid starter generator to start an engine and charge the main battery; and a vehicle controller to monitor a capacity voltage of any one of the power converter and the motor controller when there is an error in data communication of the battery controller and control charging and discharging of the main battery based on the monitored results.

14 Claims, 4 Drawing Sheets

(51) Int. Cl.
  *B60W 10/26* (2006.01)
  *B60L 11/18* (2006.01)
  *B60L 11/14* (2006.01)
  *B60W 20/50* (2016.01)

(52) U.S. Cl.
  CPC .......... *B60L 11/1861* (2013.01); *B60W 10/26* (2013.01); *B60W 20/50* (2013.01); *Y02T 10/7005* (2013.01); *Y02T 10/7216* (2013.01); *Y02T 10/7275* (2013.01); *Y02T 90/16* (2013.01); *Y10S 903/907* (2013.01)

(56) References Cited

FOREIGN PATENT DOCUMENTS

| | | | |
|---|---|---|---|
| JP | 2013212755 A | * | 10/2013 |
| JP | 2014-236625 | | 12/2014 |
| KR | 10-2007-0050680 | | 5/2007 |
| KR | 10-2012-0073520 | | 7/2012 |
| KR | 10-2013-0025014 | | 3/2013 |
| KR | 10-2013-0053553 | | 5/2013 |
| KR | 10-1394751 | | 5/2014 |

* cited by examiner

FAIL SAFE APPARATUS AND METHOD FOR ECO-FRIENDLY VEHICLE

CROSS-REFERENCE TO RELATED APPLICATION

This application claims the benefit of Korean Patent Application No. 10-2015-0053209, filed on Apr. 15, 2015, which is hereby incorporated by reference herein in its entirety.

FIELD

The present disclosure relates to a fail safe apparatus and method for an eco-friendly vehicle, and more particularly, to a fail safe apparatus and method for an eco-friendly vehicle capable of maintaining vehicle driving.

BACKGROUND

The statements in this section merely provide background information related to the present disclosure and may not constitute prior art.

Generally, eco-friendly vehicles such as a hybrid electric vehicle (HEV) and an electric vehicle (EV) are configured to include an engine control unit (ECU) controlling an engine, a motor control unit (MCU) controlling motor driving, a transmission control unit (TCU) controlling a shift of a transmission, a battery management system (BMS) monitoring and managing a battery state, and a hybrid control unit (HCU) controlling the driving of the control units, setting a driving mode of the vehicles, and controlling the general driving of the vehicles.

A vehicle controller is connected to each control unit through a controller area network (CAN) communication line, a local interconnect network communication line, and so on to transmit and receive data. Therefore, when there is a problem in the CAN communication of the battery controller, other control units may not confirm a state of charge (SOC) of a main battery. When the state of charge of the main battery may not be confirmed, the vehicle controller restricts the charging and discharging of the battery and controls the engine driving using the engine control unit, and thus the vehicle may be driven in a limp home mode.

The vehicle inevitably consumes a minimum current for driving even during the limp home driving based on the engine driving, and therefore the battery is discharged. For example, power is consumed to drive a low voltage DC-DC converter (LDC), an external auxiliary (AUX), an electric oil pump, and so on.

The battery controller forcibly opens a main battery relay to prevent the battery from being damaged at the time of overdischarging of the main battery due to the limp home driving, such that an operation of the electric oil pump stops and an oil pressure of the transmission is not yet formed. As a result, the vehicle may not be driven.

SUMMARY

The present disclosure has been made to solve the above-mentioned problems occurring in the prior art while advantages achieved by the prior art are maintained intact.

An aspect of the present disclosure provides a fail safe apparatus and method for an eco-friendly vehicle capable of maintaining vehicle driving by controlling charging and discharging of a battery using an alternative signal when a battery management system (BMS) of an eco-friendly vehicle has a data communication problem.

According to an exemplary embodiment of the present disclosure, a fail safe apparatus for an eco-friendly vehicle includes: a main battery configured to supply driving power of a vehicle; a battery controller configured to manage a state of charge of the main battery; a power converter configured to convert power supplied from the main battery into power for charging an auxiliary battery; a motor controller configured to drive a motor with the power supplied from the main battery; a hybrid starter generator configured to start an engine and charge the main battery; and a vehicle controller configured to monitor a capacity voltage of any one of the power converter and the motor controller when there is an error in data communication of the battery controller and control charging and discharging of the main battery based on the monitored results.

The power converter may be a low voltage DC-DC converter.

The vehicle controller may determine whether engine starting succeeds and a clutch connection driving is made when there is a problem in the data communication of the battery controller and determine whether the capacity voltage exceeds an upper limit threshold in the state in which the engine starting succeeds and the clutch connection driving is made.

The vehicle controller may stop the charging and the discharging of the main battery when the capacity voltage exceeds the upper limit threshold.

The upper limit threshold may be an upper limit of the charging of the main battery.

The vehicle controller may determine whether the capacity voltage is below a lower limit threshold when the capacity voltage is equal to or less than the upper limit threshold, and the vehicle controller requests to the battery controller the relay off of the main battery and performs the engine driving when the capacity voltage is below the lower limit threshold.

The vehicle controller may charge the main battery and inhibit the discharging of the main battery when the capacity voltage is equal to or more than the lower limit threshold.

The vehicle controller may request to the battery controller the relay off of the main battery and inhibits the vehicle driving when the engine starting does not succeed and the clutch connection driving is not made.

According to another form of the present disclosure, a fail safe method for an eco-friendly vehicle includes: sensing, by a vehicle controller, the occurrence of a data communication problem of a battery controller; determining whether engine starting succeeds and clutch connection driving is made, when the occurrence of the data communication problem is sensed; determining, if it is confirmed that the engine starting succeeds and the clutch connection driving is made, whether a capacity voltage of any one of a power converter and a motor controller is within a range from a lower limit threshold to an upper limit threshold; and charging the main battery and inhibiting discharging of the main battery when the capacity voltage is within the range from the lower limit threshold to the upper limit threshold.

The fail safe method may further include: inhibiting the charging and the discharging of the main battery when the capacity voltage exceeds the upper limit threshold.

The fail safe method may further include: requesting a relay off of the main battery and performing engine driving when the capacity voltage is below the lower limit threshold.

The fail safe method may further include: requesting the relay off of the main battery and inhibiting the vehicle driving when the engine starting does not succeed and the clutch connection driving is not made.

The main battery may be charged by a motor and a hybrid starter generator.

The lower limit threshold may be a lower limit of the discharging of the main battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
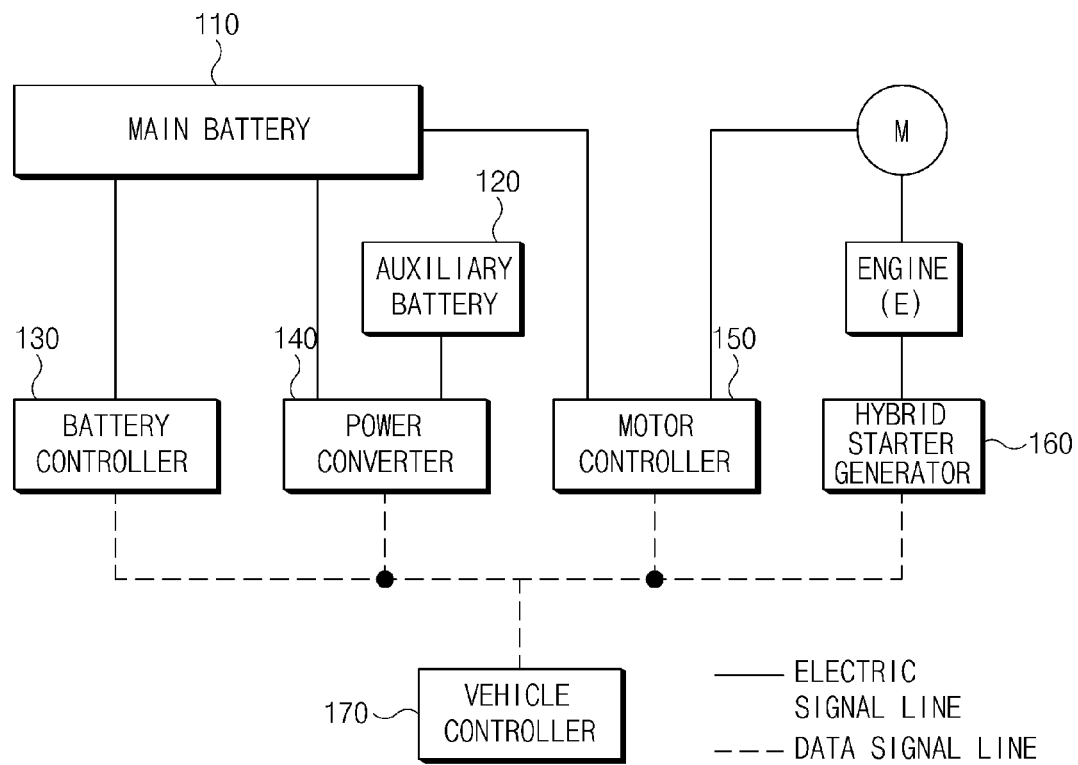
FIG. 1 is a block configuration diagram illustrating a fail safe apparatus for an eco-friendly vehicle according to an exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

According to one form of the present disclosure, when a battery management system (BMS) has a controller area network (CAN) communication problem, state of charge (SOC) information which may not be provided from the battery management system is replaced by a capacity voltage of a low voltage DC-DC converter or a motor controller to charge the battery depending on the capacity voltage. Further, according to the exemplary embodiment of the present disclosure, even though power of a low voltage DC-DC converter, power of an electric oil pump (EOP), and power of an external auxiliary (AUX) may be used in the state in which the state of charge information of the battery may not be provided, charging may be continuously made by a motor and a hybrid starter generator (HSG) so that a driver may drive a vehicle.

FIG. 1 is a block configuration diagram illustrating a fail safe apparatus for an eco-friendly vehicle according to one form of the present disclosure.

Referring to FIG. 1, the fail safe apparatus for an eco-friendly vehicle includes a main battery 110, an auxiliary battery 120, a battery controller 130, a power converter 140, a motor controller 150, a hybrid starter generator 160, and a vehicle controller 170.

The main battery 110 is a power source for supplying power required to drive a motor in eco-friendly vehicles such as an electric vehicle and a hybrid electric vehicle. The main battery 110 is implemented as a high voltage battery and includes a relay (not illustrated) which is switched to selectively supply power of the high voltage battery. The relay inputs the power supplied from the main battery 110 to a power converter 140 and/or the motor controller 150.

The auxiliary battery 120 is implemented as a low voltage battery and supplies operating power of electric loads (not illustrated).

The battery controller 130 is a battery management system (BMS) which collects and manages state information of a battery such as the temperature, voltage, charging/discharging current, state of charge (SOC), etc., of the main battery 110. The battery controller 130 provides the state information of the battery to other control units inside the vehicle.

The battery controller 130 controls turn on/off (close/open) of the relay (not illustrated) inside the main battery 110. Further, the battery controller 130 informs the vehicle controller 170 of the turn on/off state of the relay.

The power converter 140 converts high voltage DC power supplied from the main battery 110 into low voltage DC power in the state in which the relay of the main battery 110 is turned on to charge the auxiliary battery 120. The power converter 140 is implemented as a low voltage DC-DC converter (LDC).

The motor controller 150 is a motor control unit (MCU) which is supplied with the power from the main battery 110 to control the driving a motor M. The motor controller 150 includes an inverter (not illustrated) which converts DC power supplied from the main battery 110 into AC power for driving the motor M.

The hybrid starter generator (HSG) 160 is mounted in an engine E to serve to start the engine E at the time of converting an electric vehicle mode into a hybrid mode in which the engine E and the motor M are operated together. Further, the hybrid starter generator 160 charges the main battery 110 under specific operating conditions when the charge quantity (state of charge) of the battery is equal to or less than a reference.

The vehicle controller 170 performs data communication with the battery controller 130, the power converter 140, the motor controller 150, and the hybrid starter generator 160 through a vehicle network. Herein, the vehicle network may be implemented as a controller area network (CAN).

When sensing that the battery controller 130 is in a data communication impossible state, the vehicle controller 170 is converted the electric vehicle mode into the hybrid mode driving to start the engine and attempt clutch connection driving. Further, the vehicle controller 170 determines whether the engine starting succeeds and the clutch connection driving is made. That is, the vehicle controller 170 determines whether the vehicle is being driven in the hybrid mode. Meanwhile, when the engine starting fails and the clutch connection driving is not made, the vehicle controller 170 requests a relay off (open) and inhibits (stops) the vehicle driving.

When the vehicle is being driven in the hybrid mode, the vehicle controller 170 determines the state of charge of the main battery 110 using an alternative signal of the state of charge information of the battery. The vehicle controller 170 uses a capacity voltage supplied from the main battery 110 to the power converter 140 or the motor controller 150 as the alternative signal to estimate the state of charge of the battery. The vehicle controller 170 monitors the capacity voltage of the power converter 140 or the motor controller 150, instead of the state of charge information of the battery.

The vehicle controller 170 determines whether the alternative signal exceeds an upper limit threshold. Here, the upper limit threshold means an upper limit (standard for judgment on overcharging) of the charging of the battery. The vehicle controller 170 inhibits the charging and discharging of the main battery 110 when the alternative signal exceeds the upper limit threshold.

When the alternative signal is equal to or less than the upper limit threshold and is equal to or more than the lower limit threshold, the vehicle controller 170 charges the main battery 110 using the motor M or the hybrid starter generator 160 and inhibits a discharging torque command using the motor M or the hybrid starter generator 160. The lower limit threshold means the lower limit (standard for judgment on overdischarging) of the discharging of the battery. In this case, the vehicle controller 170 stops the charging when the state of charge of the main battery 110 exceeds the upper limit threshold to inhibit the battery from being damaged due to the overcharging.

Further, the vehicle controller 170 requests the relay off to the battery controller 130 and performs the engine (limp home mode) driving when the alternative signal is below the lower limit threshold. For example, in the case of the overlapping fail and the charging defect of the motor or the hybrid starter generator 160, the alternative signal is below the lower limit threshold, and therefore the vehicle controller 170 requests the relay off to the battery controller 130 to inhibit the battery from being damaged due to the overdischarging.

Figure 2:
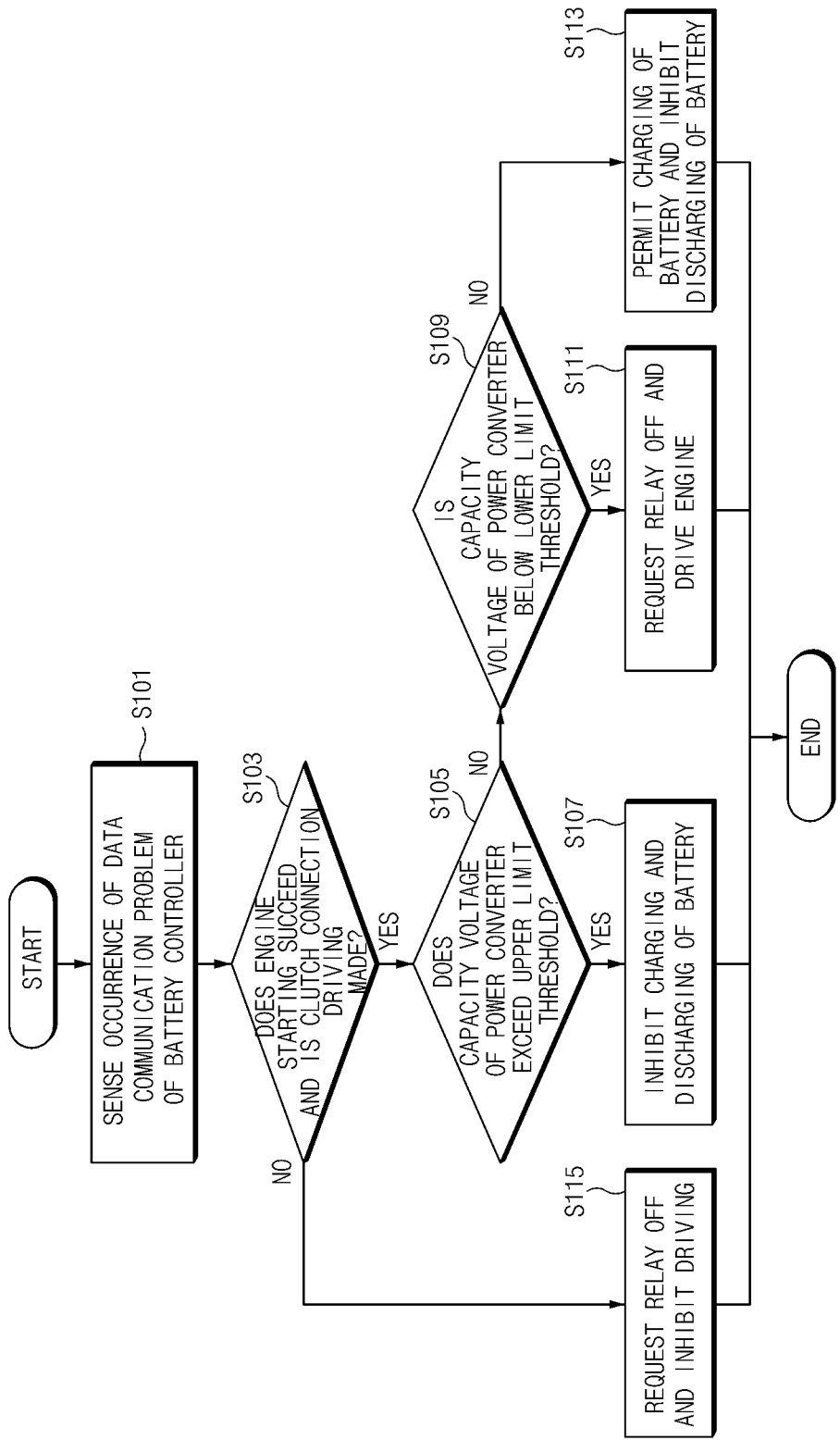
FIG. 2 is a flow chart illustrating a fail safe method for an eco-friendly vehicle according to an exemplary embodiment of the present disclosure.

FIG. 2 is a flow chart illustrating a fail safe method for an eco-friendly vehicle according to an exemplary embodiment of the present disclosure.

First, the vehicle controller 170 senses the occurrence of the data communication problem of the battery controller 130. In other words, the vehicle controller 170 determines whether the data communication with the battery controller 130 is failed, and if the data communication is failed, the state of charge of the main battery 110 may not be determined.

The vehicle controller 170 determines whether the engine starting succeeds and the clutch connection driving is made at the time of the occurrence of the data communication problem of the battery controller 130 (S103). Here, the vehicle controller 170 decides whether the vehicle is being driven in the hybrid mode.

The vehicle controller 170 determines whether the capacity voltage of the power converter 140 exceeds the upper limit threshold when the engine starting succeeds and the clutch connection driving is made (S105). The vehicle controller 170 uses the capacity voltage of the power converter 140 to determine the state of charge of the main battery 110. The upper limit threshold is the upper limit of the battery charging.

When the capacity voltage of the power converter 140 exceeds the upper limit threshold, the vehicle controller 170 inhibits (stops) the charging and discharging of the main battery 110 (S107).

Meanwhile, in the step (S105), when the capacity voltage of the power converter 140 is equal to or less than the upper limit threshold, the vehicle controller 170 determines whether the capacity voltage of the power converter 140 is below the lower limit threshold (S109). Here, the lower limit threshold is the lower limit of the battery discharging.

The vehicle controller 170 requests the relay off of the main battery 110 to the battery controller 130 and performs the engine (limp home mode) driving when the capacity voltage of the power converter is below the lower limit threshold (S111).

Meanwhile, in the step (S109), when the capacity voltage of the power converter 140 is equal to or more than the lower limit threshold, the charging of the main battery 110 is permitted and the discharging of the main battery 110 stops (S113).

Meanwhile, in the step (S103), when the vehicle state does not satisfy the engine starting success and the clutch connection driving, the relay off of the main battery 110 is requested to the battery controller 130 and the vehicle driving is limited (stops) (S115).

Figure 3:
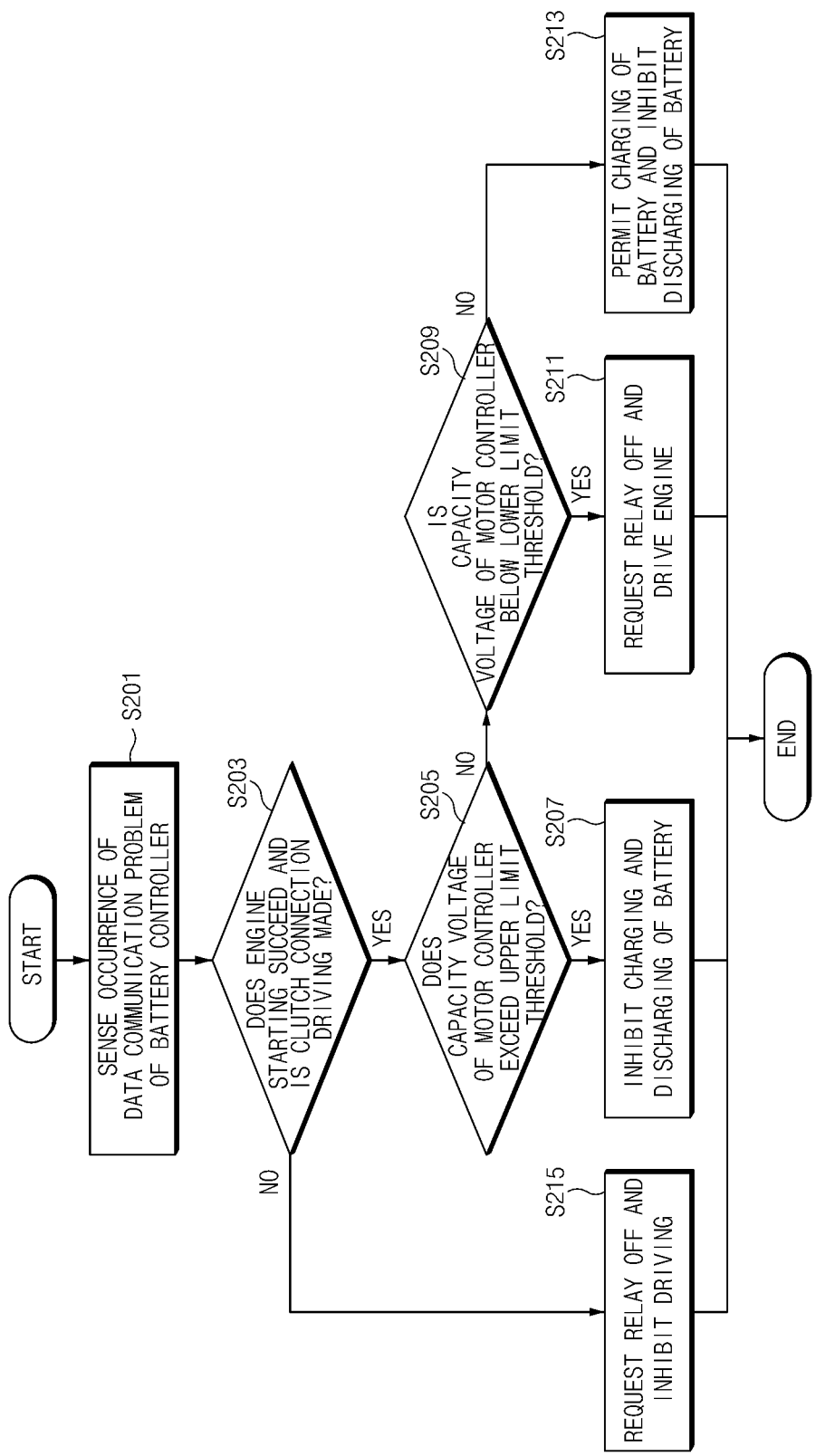
FIG. 3 is a flow chart illustrating a fail safe method for an eco-friendly vehicle according to another exemplary embodiment of the present disclosure.

FIG. 3 is a flow chart illustrating a fail safe method for an eco-friendly vehicle according to another exemplary embodiment of the present disclosure.

Referring to FIG. 3, the vehicle controller 170 senses the data communication failure state with the battery controller 130 (S201). In other words, when the state of charge of the main battery 110 is not sensed, the vehicle controller 170 recognizes that the data communication problem of the battery controller 130 occurs.

The vehicle controller 170 determines whether the engine starting succeeds and the clutch connection driving is made at the time of the occurrence of the data communication problem of the battery controller 130 (S203). Here, the vehicle controller 170 determines whether the vehicle is being driven in the hybrid mode.

The vehicle controller 170 determines whether the capacity voltage of the motor controller 150 exceeds the upper limit threshold when the engine starting succeeds and the clutch connection driving is made (S205). The vehicle controller 170 uses the capacity voltage of the motor controller 150 to confirm the state of charge of the main battery 110. The upper limit threshold is the upper limit of the battery charging.

When the capacity voltage of the motor controller 150 exceeds the upper limit threshold, the vehicle controller 170 inhibits (stops) the charging and discharging of the main battery 110 (S207).

Meanwhile, in the step (S105), when the capacity voltage of the motor controller 150 is equal to or less than the upper limit threshold, the vehicle controller 170 determines whether the capacity voltage of the motor controller 150 is below the lower limit threshold (S209). Here, the lower limit threshold is the lower limit of the battery discharging.

The vehicle controller 170 requests the relay off of the main battery 110 to the battery controller 130 and performs the engine (limp home mode) driving when the capacity voltage of the power converter is below the lower limit threshold (S211).

Meanwhile, in the step (S109), when the capacity voltage of the motor controller 150 is equal to or more than the lower limit threshold, the charging of the main battery 110 is permitted and the discharging of the main battery 110 stops (S213).

Meanwhile, in the step (S103), when the vehicle state does not satisfy the engine starting success and the clutch connection driving, the relay off of the main battery 110 is requested to the battery controller 130 and the vehicle driving is limited (stops) (S215).

Figure 4:
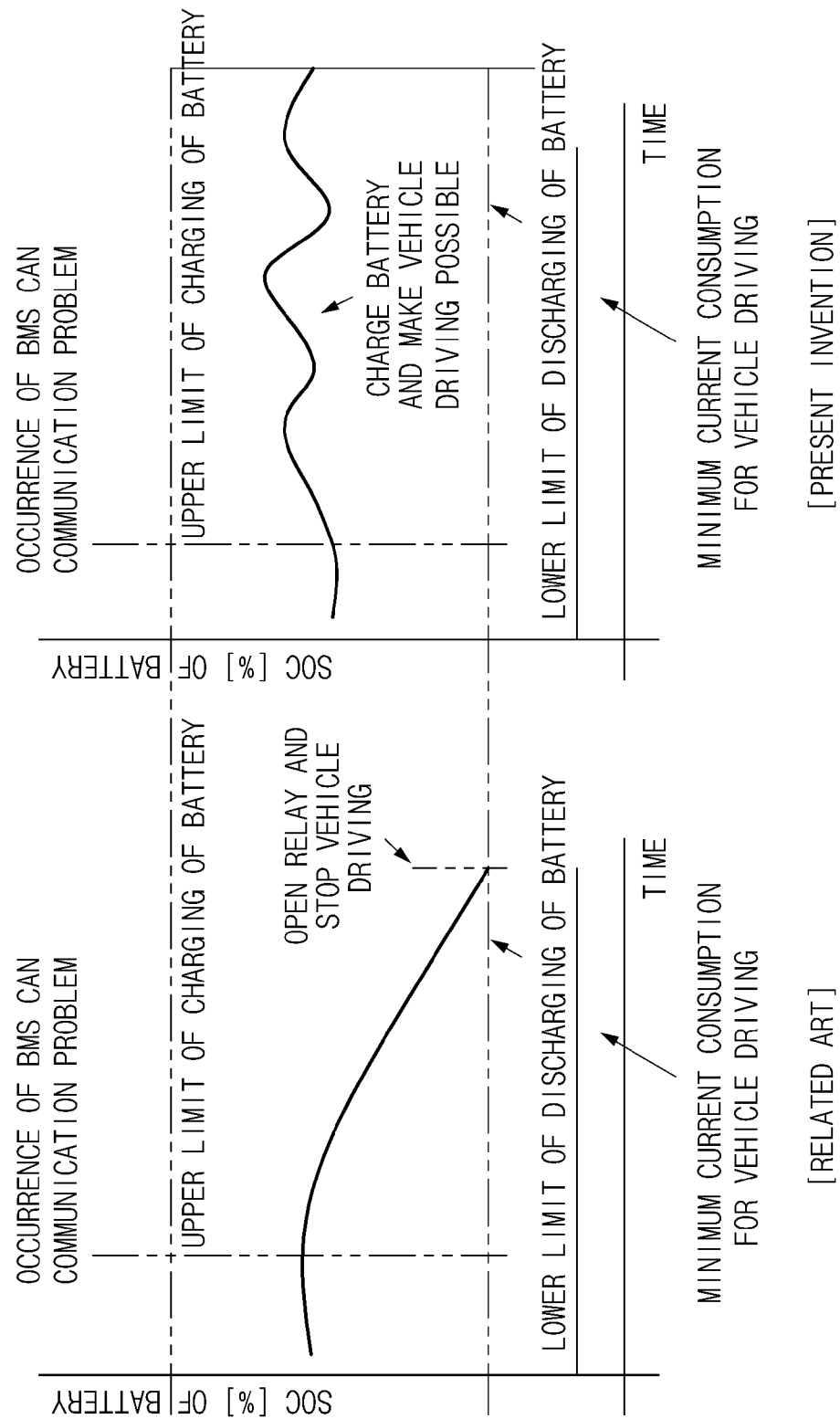
FIG. 4 is a graph for describing a change in a state of charge of a battery after a data communication error of a battery controller according to an exemplary embodiment of the present disclosure occurs.

FIG. 4 is a graph for describing a change in a state of charge of a battery after a data communication error of a battery controller according to an exemplary embodiment of the present disclosure occurs.

Referring to FIG. 4, the related art may not confirm the state of charge (SOC) of the battery when the data communication error of the battery controller 130 occurs and thus the vehicle suddenly stops due to the discharging of the battery, which threats the safety of the driver.

On the other hand, according to the exemplary embodiment of the present disclosure, even though the data communication error of the battery controller 130 occurs, the capacity voltage at the input side of the power converter 140 or the motor controller 150 is monitored and thus the state of charge of the main battery 110 may be confirmed. Therefore, according to the exemplary embodiment of the present disclosure, even when the data communication error occurs in the battery controller 130, the main battery 110 may be charged and the vehicle driving may be kept.

As described above, according to the exemplary embodiments of the present disclosure, it is possible to maintain the vehicle driving by controlling charging and discharging the battery using the alternative signal even when the battery management system (BMS) of the eco-friendly vehicle has the data communication problem.

Further, according to the present disclosure, it is possible to avoid accidents due to the sudden stop of the vehicle due to the discharging of the battery and secure the safety.

The present disclosure may be implemented by various means, for example, hardware, firmware, software, or a combination thereof, or the like. In the case of the implementation by the hardware, the exemplary embodiments of the present disclosure may be implemented by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Although the preferred embodiments and application examples of the present disclosure have been disclosed for illustrative purposes, those skilled in the art will appreciate that the present disclosure is not limited to specific embodiments and application examples and various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A fail safe apparatus for an eco-friendly vehicle, comprising:
    a main battery configured to supply driving power of a vehicle;
    a battery controller configured to manage a state of charge of the main battery;
    a power converter configured to convert power supplied from the main battery into power for charging an auxiliary battery;
    a motor controller configured to drive a motor with the power supplied from the main battery;
    a hybrid starter generator configured to start an engine and charge the main battery; and
    a vehicle controller configured to monitor a capacity voltage of at least one of the power converter and the motor controller when there is an error in data communication of the battery controller, and configured to control charging and discharging of the main battery based on monitored results of the capacity voltage.

2. The fail safe apparatus according to claim 1, wherein the power converter is a low voltage DC-DC converter.

3. The fail safe apparatus according to claim 1, wherein when the error in the data communication of the battery controller is determined, the vehicle controller is configured to determine whether engine starting succeeds and a clutch connection driving is made and is configured to determine whether the capacity voltage exceeds an upper limit threshold when the engine starting succeeds and the clutch connection driving is made.

4. The fail safe apparatus according to claim 3, wherein the vehicle controller is configured to stop the charging and the discharging of the main battery when the capacity voltage exceeds an upper limit threshold.

5. The fail safe apparatus according to claim 4, wherein the upper limit threshold is an upper limit of the charging of the main battery.

6. The fail safe apparatus according to claim 3, wherein the vehicle controller is configured to determine whether the capacity voltage is below a lower limit threshold when the capacity voltage is equal to or less than the upper limit threshold and is configured to request to the battery controller a relay off of the main battery and to perform an engine driving when the capacity voltage is below the lower limit threshold.

7. The fail safe apparatus according to claim 6, wherein the vehicle controller is configured to charge the main battery and to inhibit the discharging of the main battery when the capacity voltage is equal to or more than the lower limit threshold.

8. The fail safe apparatus according to claim 3, wherein the vehicle controller is configured to request to the battery controller a relay off of the main battery and inhibits the vehicle driving when an engine starting does not succeed and the clutch connection driving is not made.

9. A fail safe method for an eco-friendly vehicle, comprising:
    sensing, by a vehicle controller, an occurrence of a data communication problem of a battery controller;
    determining whether engine starting succeeds and clutch connection driving is made, when the occurrence of the data communication problem is sensed;
    determining, if it is confirmed that the engine starting succeeds and the clutch connection driving is made, whether a capacity voltage of at least one of a power converter and a motor controller is within a range from a lower limit threshold to an upper limit threshold; and
    charging a main battery and inhibiting discharging of the main battery when the capacity voltage is within the range.

10. The fail safe method according to claim 9, further comprising:
    inhibiting the charging and the discharging of the main battery when the capacity voltage exceeds the upper limit threshold.

11. The fail safe method according to claim 9, further comprising:
    requesting a relay off of the main battery and performing engine driving when the capacity voltage is below the lower limit threshold.

12. The fail safe method according to claim 9, further comprising:
    requesting a relay off of the main battery and inhibiting vehicle driving when the engine starting does not succeed and the clutch connection driving is not made.

13. The fail safe method according to claim 9, wherein the main battery is charged by a motor and a hybrid starter generator.

14. The fail safe method according to claim 9, wherein the lower limit threshold is a lower limit of the discharging of the main battery.

* * * * *